United States Patent [19]

Koster et al.

[11] Patent Number: 4,600,169
[45] Date of Patent: Jul. 15, 1986

[54] INTEGRATED SPACECRAFT CRADLE AND SHUTTLE STRUCTURE

[75] Inventors: William G. Koster, Tustin; Allan B. Byrne, Agoura, both of Calif.

[73] Assignee: Hughes Aircraft Company, Los Angeles, Calif.

[21] Appl. No.: 564,964

[22] Filed: Dec. 23, 1983

[51] Int. Cl.⁴ .............................. B64C 1/20; B64G 1/22
[52] U.S. Cl. ..................... 244/118.1; 244/158 R; 410/49; 410/77
[58] Field of Search ............. 244/158 R, 160, 161, 244/118.1; 410/2, 46, 47, 49, 77, 91; 292/341.18, 341.19

[56] References Cited

U.S. PATENT DOCUMENTS

| | | | |
|---|---|---|---|
| 2,593,472 | 4/1952 | McGinn | 410/46 |
| 2,843,345 | 7/1958 | Sikorsky | 244/17.17 |
| 3,815,849 | 6/1974 | Meston | 244/160 |
| 4,359,201 | 11/1982 | Thomson et al. | 244/158 R |
| 4,395,004 | 7/1983 | Ganssle et al. | 244/158 R |

FOREIGN PATENT DOCUMENTS

| | | | |
|---|---|---|---|
| 18389 | 7/1904 | Austria | 410/46 |
| 1203155 | 10/1965 | Fed. Rep. of Germany | 292/341.18 |

Primary Examiner—Galen L. Barefoot
Attorney, Agent, or Firm—S. C. Durant; M. J. Meltzer; A. W. Karambelas

[57] ABSTRACT

A spacecraft is mounted in a cradle secured in the space shuttle by means of a suspension system including four cradle attachment members secured to the upper longeron bridge of the shuttle, in which provision is made for movably mounting one attachment member on the cradle to provide a component of movement substantially normal to the adjacent longeron bridge to accommodate misalignment between the longeron bridges and the attachment members without the need for removing the spacecraft and cradle from the shuttle.

7 Claims, 12 Drawing Figures

FORWARD

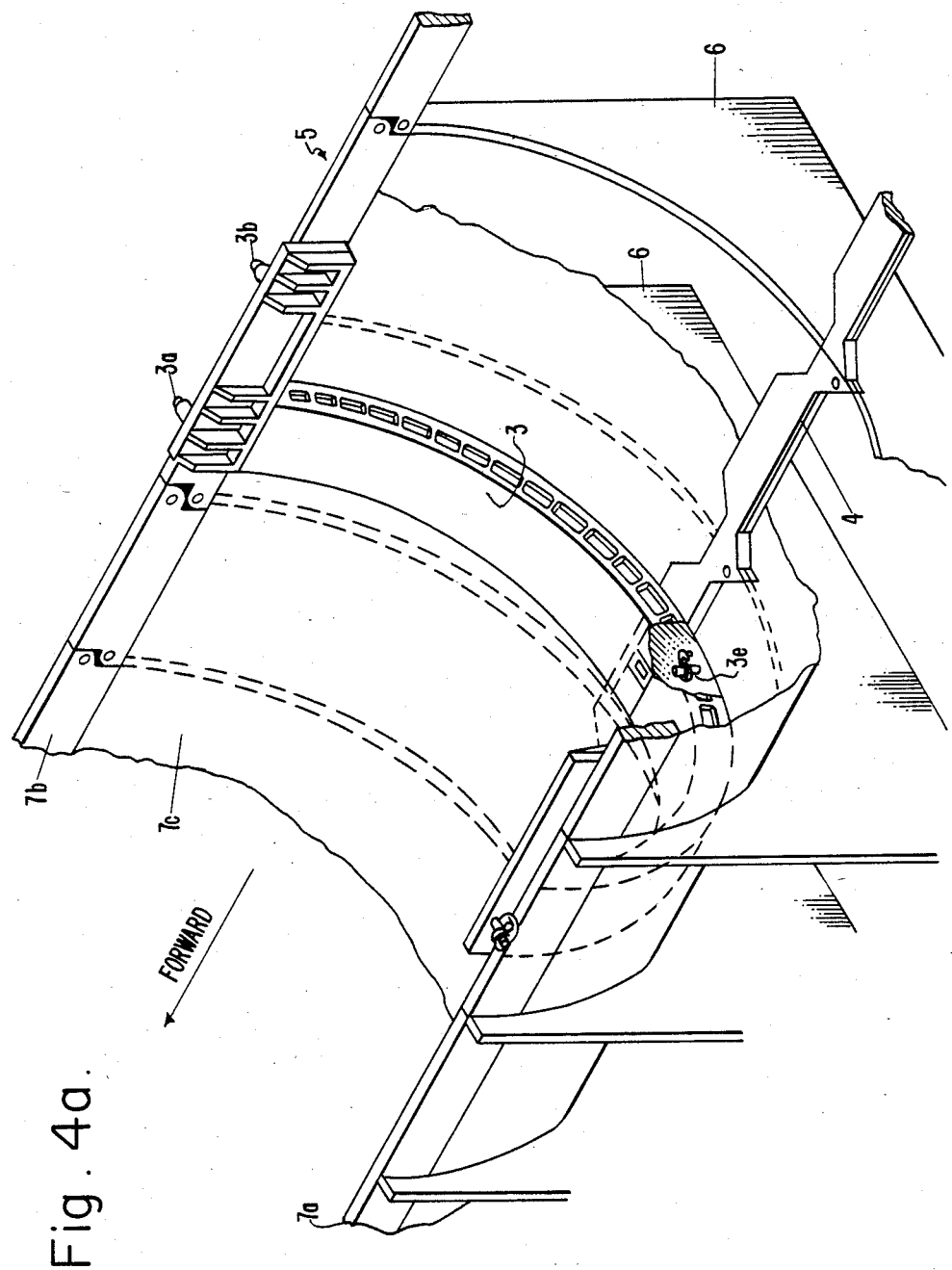

INTEGRATED SPACECRAFT CRADLE AND SHUTTLE STRUCTURE

BACKGROUND OF THE INVENTION

1. Field of the Invention

This invention relates generally to a structure for supporting a payload such as a spacecraft or a satellite in a launch vehicle and, more particularly, to such a structure having facilities for accommodating nominal misalignment between the attachment points of the structure and the supporting points on the launch vehicle.

2. Description of the Prior Art

The advent of a launch vehicle such as the space shuttle with its wide cargo bay permitted the development of larger space vehicles than were accommodatable on conventional, expendable rocket boosters. To maximize the utilization of the available space in the cargo bay, particularly with respect to a cross-sectional area, a new satellite and launching technique were developed as described in U.S. Pat. No. 4,359,201. Here, a spin-stabilized spacecraft of circular cross-section is mounted with its spin axis parallel to the longitudinal axis of the shuttle. The spacecraft is mounted in a carrier depicted as a cradle which, in turn, is secured to the longeron bridges and the keel of the space shuttle. The spacecraft is deployed from the shuttle with linear and angular velocity as though it were rolling up a ramp out of the shuttle bay, and thus is initially spin-stabilized as it moves away from the shuttle.

The spacecraft is constructed of a tubular truss frame which is integrated with a lightweight cradle which, in turn, is attached to the shuttle bay main frames which is comprised of a pair of upper longeron bridges bridging the bulkheads and a lower cargo bay keel bridge.

The tubular truss frame of the spacecraft is relatively stiff and when integrated with the lightweight cradle, stiffens the cradle. One or more of the cradle attach points therefore require shimming to compensate misalignment with the shuttle longerons and keel bridges when the integrated spacecraft and cradle are secured in the shuttle bay. Space limitations require removal of the integrated spacecraft and cradle for each adjustment until all four of the attach points engage the upper longeron bridges.

SUMMARY OF THE INVENTION

This invention provides improvements in the cradle structure which eliminates the need for removal of the spacecraft and cradle in making adjustments to compensate misalignments. The cradle is generally similar to that described in U.S. Pat. No. 4,359,201 in that it again is of lightweight structure, is generally of semicircular configuration and is equipped with four attachment members or trunnions, two on each side of the open end of the cradle in longitudinally spaced positions and extending radially outwardly from the cradle structure. These trunnions are seated in and secured in cradle attach fittings mounted on the longeron bridges and provision is made for movably mounting one attachment member or trunnion on the cradle to provide a component of movement substantially normal to the adjacent longeron bridge cradle attach fitting. Thus, with the three fixed trunnions seated in the cradle attach fittings on the longeron bridges, the fourth movably mounted trunnion is adjusted to engage its cradle attach fitting, obviating any stressing due to misalignment of the parts when the integrated spacecraft and cradle are secured in the shuttle bay.

The movably mounted trunnion is driven by means of an irreversible mechanism which, for additional security, may be provided with a locking mechanism to obviate any possibility of movement of the mechanism once the adjustment is made. The irreversible mechanism is accessible from a position external of the cradle and the shuttle for the purpose of making needed adjustments obviating any need for removing the integrated spacecraft and cradle to make adjustments.

BRIEF DESCRIPTION OF THE DRAWINGS

The invention, including its various objects, features, and advantages, may be more readily understood with reference to the following detailed description of two embodiments thereof, taken in conjunction with the accompanying drawings, wherein like reference numerals designate like structural elements, and in which:

FIG. 4a is a perspective view on a larger scale depicting the disposition of the cradle in the shuttle bay;

DETAILED DESCRIPTION OF THE INVENTION

Figure 1:
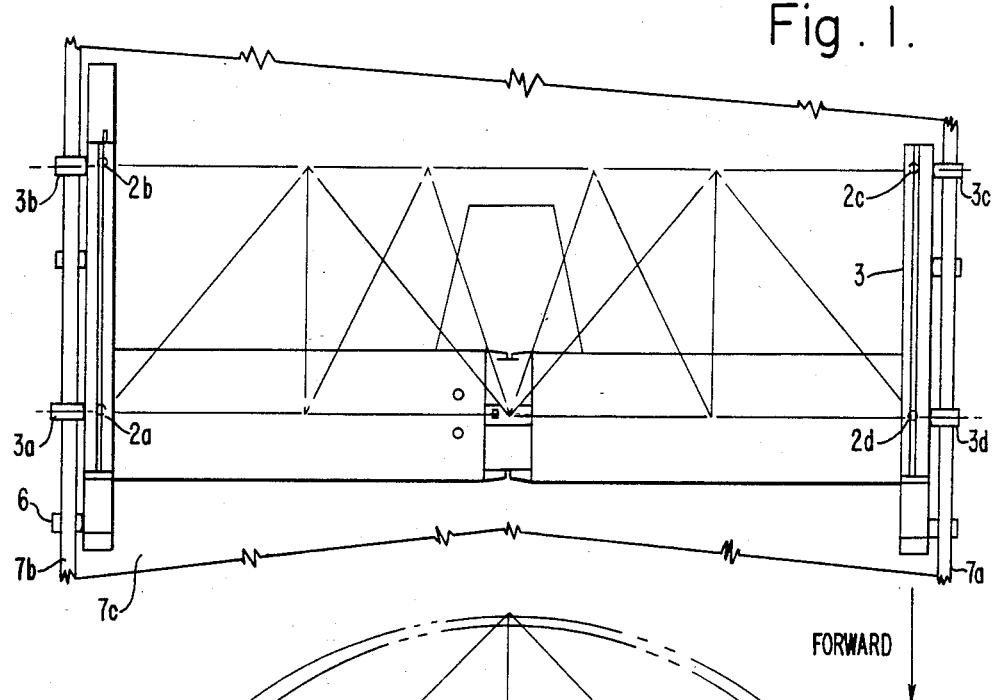
FIGS. 1, 2 and 3 are respectively top, front and side elevational views of an integrated spacecraft and cradle structure generally depicting the disposition of the cradle in the fragmentarily depicted shuttle bay.
Figure 2:
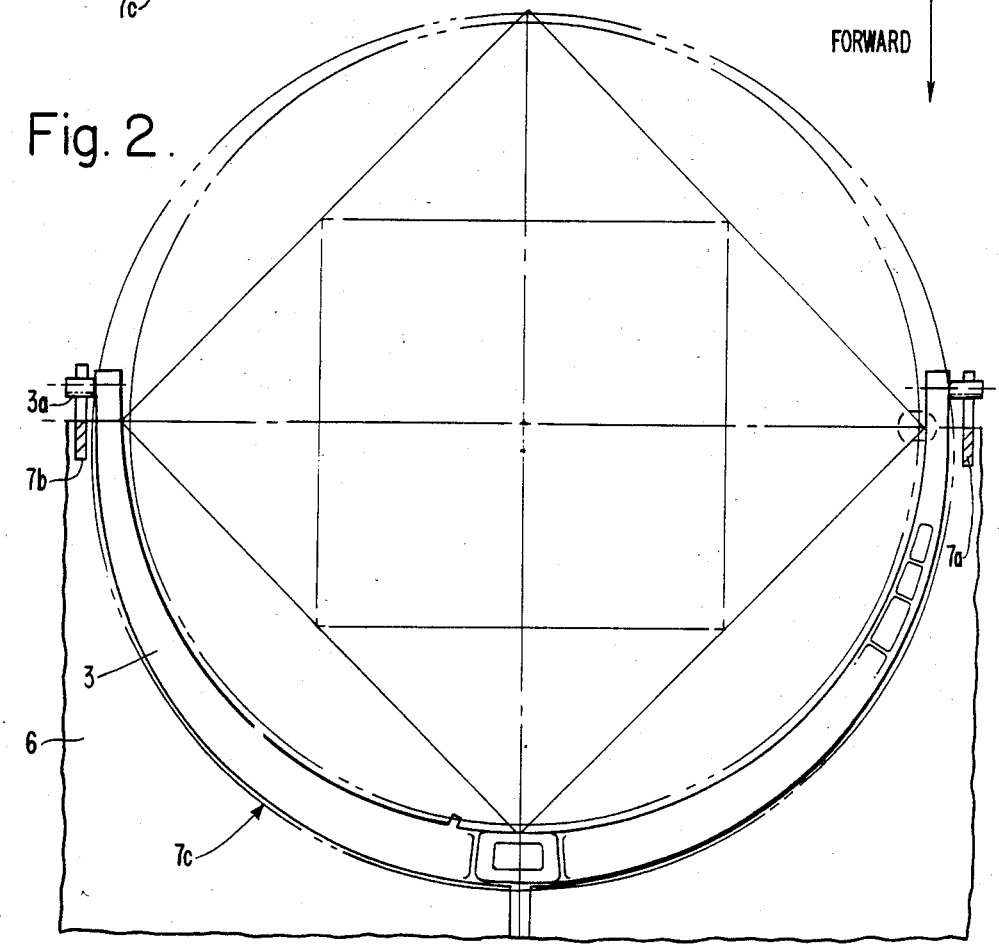
Figure 3:
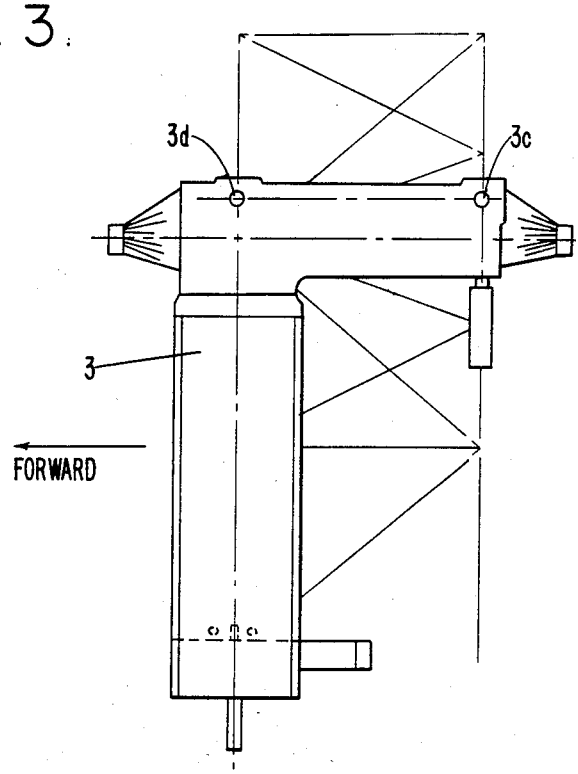
Figure 4B:
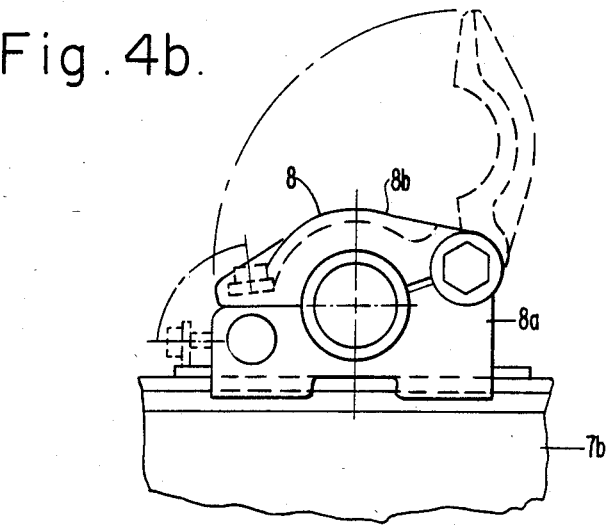
FIG. 4b is a detail of one cradle attach fitting.

Referring to FIGS. 1, 2, 3, 4a and 4b, the spacecraft 1 is generally of cylindrical configuration and is proportioned such that its spin moment of inertia is greater than the moment of inertia about any other axis. The spacecraft comprises a tubular truss structure, generally designated 2, attached at four points 2a, 2b, 2c and 2d to a generally semicircular cradle 3 provided with trunnions 3a, 3b, 3c and 3d. These trunnions project radially outwardly from the upper ends of the cradle as seen in FIG. 2 in longitudinally spaced pairs on opposite sides of the cradle. As will be seen by reference to FIGS. 2, 3, and 4a, the cradle is provided with a fifth attachment member 3e engaging a lower cargo bay keel bridge 4 of the shuttle bay 5 in which the cradle 3 is mounted. The shuttle bay structure conventionally includes a plurality of longitudinally spaced shuttle mainframes or bulkheads 6 which are integrated by the lower cargo bay keel bridge 4 and a pair of upper longerons 7a and 7b. The interior of the shuttle bay is defined by a sheet liner 7c secured to the shuttle bulkheads 6 and the longerons 7a and 7b. The spacecraft is not shown in FIG. 4a in the interest of clarity. With particular reference to FIGS. 4a and 4b, the cradle trunnions 3a, 3b, 3c and 3d are secured to the upper longeron bridges 7a, 7b by means of individual cradle attach fittings 8, one of which is typically depicted in FIG. 4b. These cradle attach fittings 8 are in the form of split clamps comprising a base portion 8a slidably fitted on a longeron bridge such as 7b and an upper portion 8b pivoted on one side to permit pivotal movement to a position as depicted in dot-dash outline clearing the bearing surface in the lower clamp section 8a to permit lowering of the trunnion into the bearing.

Dimensional tolerances in aircraft structures, coupled with their flexibility, do not permit precision in the location of parts or the dimensional stability of such locations in a degree such that a four-point suspension of the type depicted will fit precisely in differing installations. In such a four-point engagement, one point usually will require adjustment. A presently preferred embodiment of this invention, movably mounts one of the trunnions, for example, the cradle trunnion 3c, to provide a component of movement normal or perpendicular to the adjacent longeron bridge and utilizes an irreversible drive mechanism engaging the trunnion to adjust the trunnion so that all four points bear equally in the journals of the cradle attach fittings. Although the drive is irreversible, further security against movement is provided in a locking mechansim which secures the irreversible drive mechanism against movement once positioning is completed.

Figure 5:
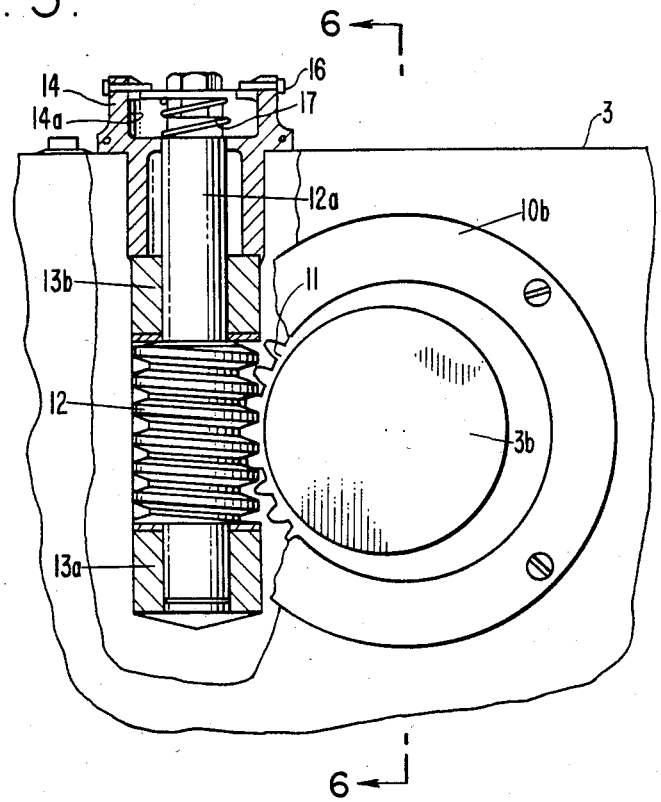
FIGS. 5 and 6 are respectively end and side views of the adjustable trunnion depicting the irreversible trunnion drive mechanism and locking arrangement.
Figure 6:
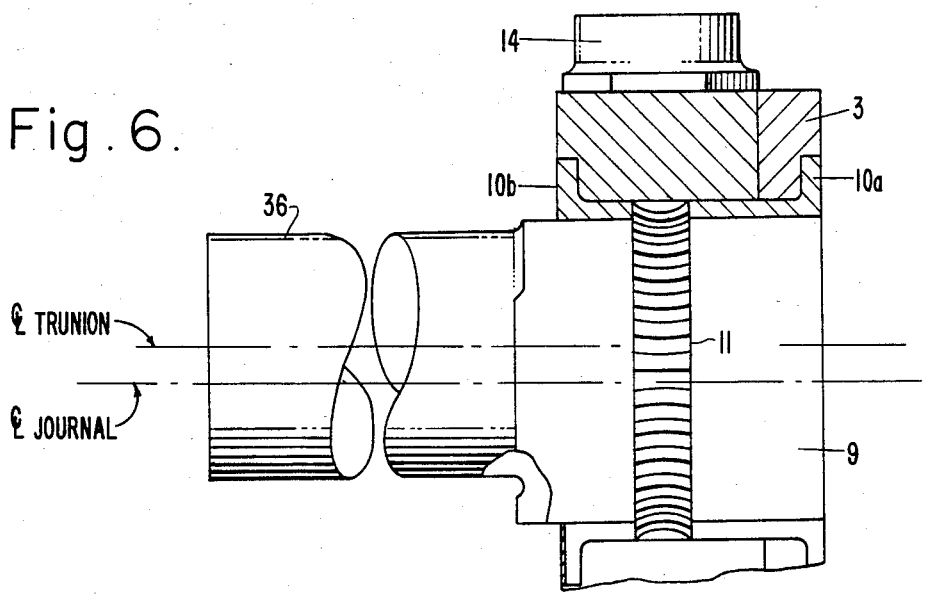

Such a presently preferred embodiment is depicted in FIGS. 5 and 6. Here the center line of the trunnion 3b is eccentric with respect to the center line of the trunnion journal 9. In one embodiment of this invention, this eccentricity was 0.25 inch. Inboard and outboard trunnion bearings 10a and 10b rotatably mount the trunnion journal 9 in the upper end of the cradle 3. A worm wheel 11 is concentrically disposed with respect to the trunnion journal 9 in a position between the inner ends of the trunnion bearings 10a and 10b securing the trunnion against axial movement. The worm wheel 11 is engaged by a worm drive 12 journaled in sleeve bearings 13a and 13b. Rotation of the worm drive 12 rotates the eccentric trunnion providing a component of motion normal to the longeron bridge.

Figure 7:
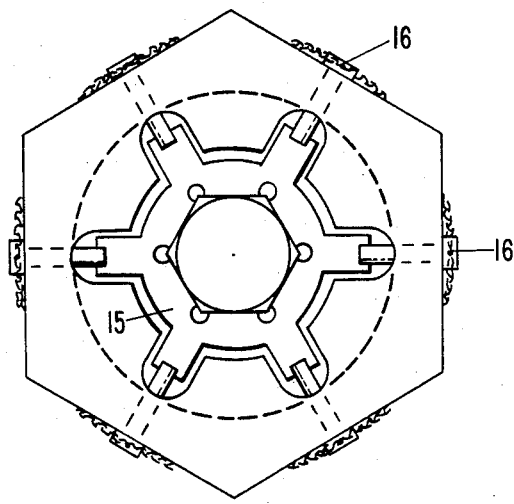
FIGS. 7 and 8 respectively are top and longitudinal sectional views of the locking mechansim drawn to an enlarged scale.
Figure 8:
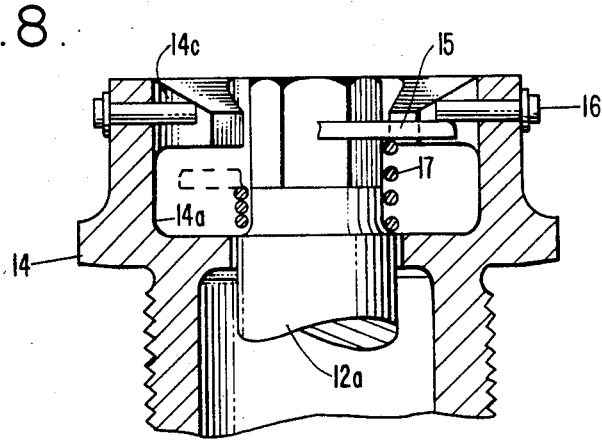

Access to the worm drive from a position external of the shuttle is provided at the upper end of the worm shaft 12a. Details of this provision, together with the locking mechansim for the worm shaft, are shown in the enlarged views of FIGS. 7 and 8. The upper end of the worm shaft 12a terminates in a hexhead configuration projecting into a cylindrical cavity 14a of a detent locknut 14 which is threaded into the upper face or edge of the cradle 3. The detent locknut 14 is provided with a radially slotted inwardly projecting flange at the upper end of the cylindrical cavity 14a. A six-pronged plate sprocket 15, having a hexagonal central opening, is slidably fitted over the hexagonal head of the worm shaft 12a. Sprocket retaining screws 16 are threaded through the detent walls defining the cylindrical cavity 14a and project radially into the radial slots in positions above the sprocket prongs to limit upward movement of the sprocket. A compression spring 17 is disposed between the sprocket and a flange at the base of the hexhead on the worm shaft. When the sprocket plate 15 is in its upward position, engaging the screws 16, it is restrained from rotation since the sprocket arms project into the radial slots. In its lower most position, depicted in dot-dash outline, the sprocket arms are clear of the radial slots and the worm shaft may be rotated.

Figure 9:
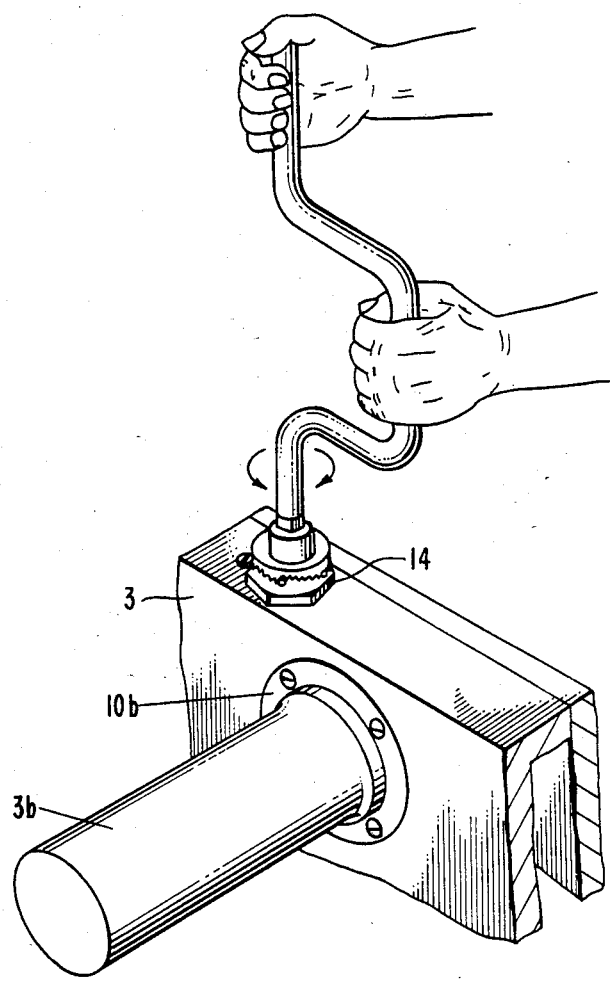
FIG. 9 is a perspective view depicting the way in which the trunnion adjustment is made.

Provision for rotating the worm shaft is depicted in FIG. 9 wherein a conventional speed wrench, having a socket fitted over the hexagonal head of the worm shaft, may be operated to depress the sprocket against the spring load which clears the sprocket arms from the slots to permit rotation of the worm shaft one direction or the other.

The use of a worm drive to rotate the trunnion provides an irreversible drive mechanism in which rotational movement of the trunnion is obviated once an adjustment is made. Further security to obviate any possibility of trunnion rotation is provided by the associated detent mechanism.

The eccentric trunnion arrangement, while providing a component of movement perpendicular to the adjacent longeron bridge, also introduces a component of motion parallel to the longeron bridge. As discussed in connection with FIG. 4b, that cradle attach fitting engaging the adjustable trunnion 3b slidably engages the associated longeron bridge 7b to slide longitudinally of that longeron bridge during the period of adjustment. While such sliding engagement is shown in FIG. 4b, provision (not shown) may be made additionally to secure the cradle attach fitting once trunnion adjustment is completed.

Figure 10:
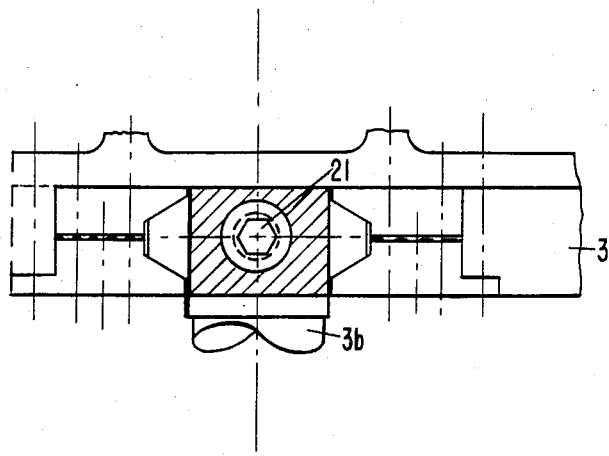
FIGS. 10 and 11 are respectively top and end views of a different adjustable trunnion assembly.
Figure 11:
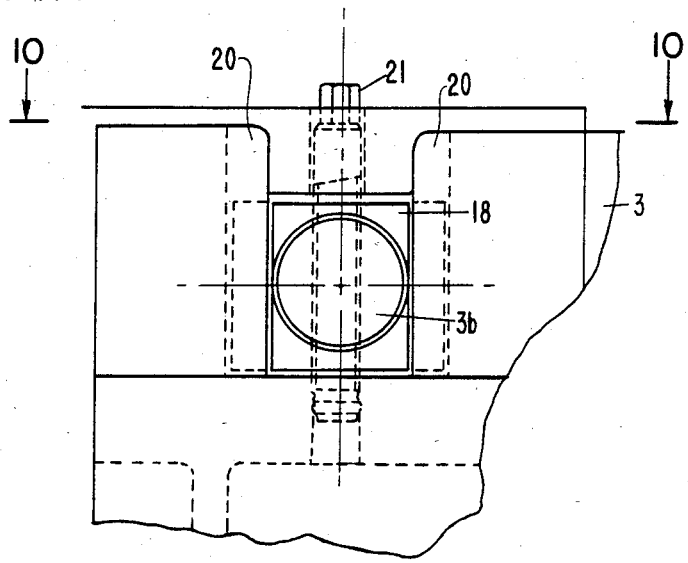

A further embodiment of this invention is shown in FIGS. 10 and 11. Here, again, an arrangement is provided which embodies the principles of this invention in the provision of an adjustable trunnion providing a component of trunnion movement perpendicular to the adjacent longeron bridge by means of an irreversible drive mechanism. The trunnion 3b is secured in a bearing block 18 which is slidably mounted in supports 20 disposed on its opposite sides. A screw 21, also provided with a hexagonal head, is threaded through the slidably mounted bearing 18 and rotatably journaled and axially secured against sliding movement at its upper and lower ends. Here, again, a speed wrench may be applied to the hexagonal head to rotate the screw to move the trunnion 3b toward and away from the adjacent longeron bridge.

Although the invention has been illustrated and described using the space shuttle and a spin-stabilized space vehicle as examples, it will be appreciated that the invention is usable with other than spin-stabilized space vehicles and is applicable with other launch vehicles.

What is claimed is:

1. An arrangement for supporting a space vehicle in a launch vehicle, comprising:
   a carrier for receiving and supporting said space vehicle;
   a plurality of attachment members on said carrier for engaging said launch vehicle;
   means movably mounting at least one attachment member on said carrier to provide a component of movement along a path toward and away from said launch vehicle to provide adjustment so that all of said attachment members engage said launch vehicle;
   a mechanical drive mechanism having at least one rotatable drive member including a threaded portion engaging said at least one attachment member to move said at least one attachment member; and
   means for substantially preventing movement of said at least one attachment member by substantially preventing rotation of said rotatable drive member when at least one attachment member engages said launch vehicle.

2. Apparatus as set forth in claim 1 in which said rotatable driver member comprises a threaded member journaled for rotation in said carrier in engagement with said at least one attachment member and having an end engagable to permit rotation from a position externally of said carrier, the axis of rotation of said threaded member paralleling said path.

3. Apparatus as set forth in claim 1 including means slidably mounting said at least one adjustable member for sliding movement along said path and in which said rotatable drive member comprises a screw journaled for rotation in said carrier in threaded engagement with said at least one attachment member, the axis of said screw paralleling said path.

4. Apparatus as set forth in claim 1 in which said at least one attachment member comprises a trunnion having an eccentric journal rotatably mounted in said carrier so that said trunnion when rotated has a component of movement along said path;
   a worm wheel concentrically connected to said journal; and
   a worm rotatably mounted in said carrier and engaging said worm wheel and having an end engagable to permit worm rotation from a position externally of said carrier for rotating said worm wheel and trunnion.

5. Apparatus as set forth in claim 4 including a detent mechanism engaging said end and having a movable spring loaded locking member normally in detent position and locking said worm against rotation and movable against said spring load from detent position to permit rotation of said worm.

6. Apparatus as set forth in claim 1 wherein said mechanical drive member is accessible for rotation from a position externally of said carrier and said launch vehicle.

7. An arrangement for supporting a space vehicle in a launch vehicle, comprising:
   a carrier for receiving and supporting said space vehicle;
   a plurality of attachment members on said carrier for engaging said launch vehicle;
   one of said attachment members comprising a trunnion having a journal the axis of which is eccentric to and parallel to the axis of said trunnion;
   means rotatably mounting said journal on said carrier so that rotation of said trunnion about the axis of said journal produces a component of trunnion movement along a path toward and away from said launch vehicle;
   a mechanical drive mechanism having at least one rotatable driver member engaging said journal to move said trunnion; and
   means for substantially preventing movement of said at least one attachment member by substantially preventing rotation of said rotatable drive member when said at least one attachment member engages said launch vehicle.

* * * * *